United States Patent [19]

Stubben et al.

[11] 4,324,401
[45] Apr. 13, 1982

[54] METHOD AND SYSTEM FOR GENERATING MOVING OBJECTS ON A VIDEO DISPLAY SCREEN

[75] Inventors: David R. Stubben, Milpitas; Lyle V. Rains, San Jose, both of Calif.

[73] Assignee: Atari, Inc., Sunnyvale, Calif.

[21] Appl. No.: 3,445

[22] Filed: Jan. 15, 1979

[51] Int. Cl.³ .............................................. A63F 9/22
[52] U.S. Cl. ........................ 273/85 G; 273/DIG. 28; 340/725; 340/750
[58] Field of Search ................ 273/85 G, 86 R, 86 B, 273/313, DIG. 28; 340/723–725, 735, 750, 751, 789, 802, 790, 703; 364/410

[56] References Cited

U.S. PATENT DOCUMENTS

| | | | |
|---|---|---|---|
| 3,396,377 | 8/1968 | Strout | 340/750 |
| 3,675,232 | 7/1972 | Strout | 340/790 |
| 3,778,810 | 12/1973 | Hayashi | 340/735 X |
| 3,999,167 | 12/1976 | Ito et al. | 340/789 X |
| 4,075,620 | 2/1978 | Passavant et al. | 340/750 X |
| 4,107,665 | 8/1978 | Mayer et al. | 273/DIG. 28 |
| 4,116,444 | 9/1978 | Mayer et al. | 273/313 |
| 4,124,843 | 11/1978 | Bramson | 340/735 |
| 4,158,837 | 6/1979 | Zahorsky | 340/750 |
| 4,169,262 | 9/1979 | Schwartz et al. | 273/313 |

Primary Examiner—Vance Y. Hum
Attorney, Agent, or Firm—Townsend and Townsend

[57] ABSTRACT

A number of moving objects and stationary playfield objects are generated on a video display screen by sharing memory and circuitry on both a physical and time-share basis. Video graphics data for playfield and motion objects is stored in a read-only memory (ROM). An object attribute memory, which may be updated at any time, is scanned during each horizontal retrace interval to provide information used to selectively read moving object video data from the ROM and assemble and store a complete horizontal line of moving object video graphics data in a separate staging memory. During active scan time of the horizontal video display line, the assembled line of moving object video data is accessed from the staging memory and communicated to the display screen via appropriate video circuitry to produce the video of the moving objects. At the same time, the object attribute memory is accessed for playfield object information which, in turn, is used to address the video graphics ROM to produce the actual video image of playfield objects. The video image of playfield objects so obtained is also communicated to the display screen through the video circuits.

15 Claims, 1 Drawing Figure

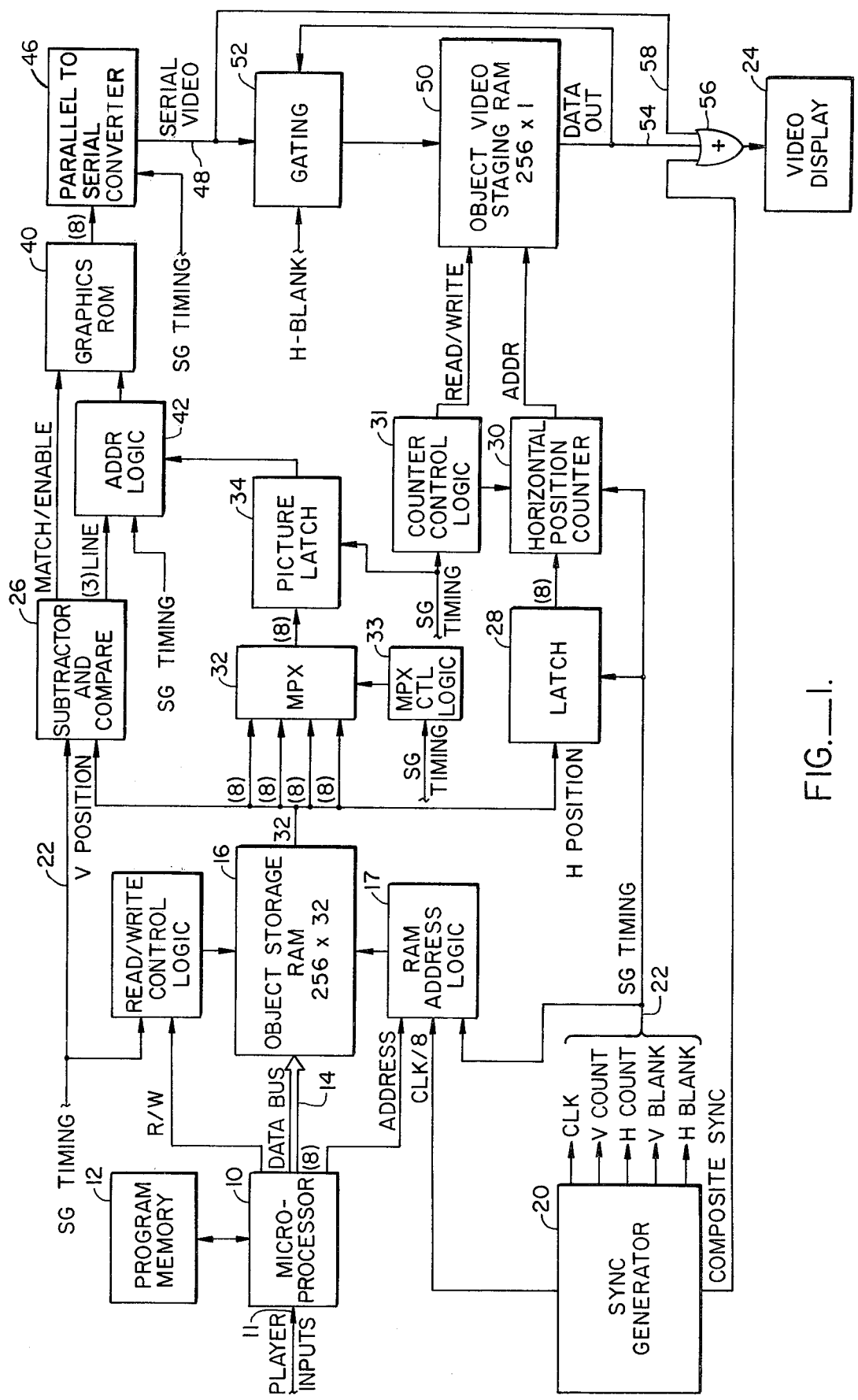
FIG._1.

METHOD AND SYSTEM FOR GENERATING MOVING OBJECTS ON A VIDEO DISPLAY SCREEN

BACKGROUND OF THE INVENTION

The present invention pertains generally to the display of video images and more particularly to a method for generating a number of moving objects on a television-type video display screen in the context of a video amusement game.

Typically, such display screens utilize an image-forming beam that traverses the screen along a plurality of sequentially scanned horizontal lines in response to horizontal and vertical synchronizing signals, including horizontal and vertical retrace intervals. Manual control inputs are provided for a plurality of game players, the inputs being monitored by a microprocessor unit to determine the motion of the objects. The basic criterion for the display of multiple objects is that the control circuitry or logic be capable of effecting variations in the intensity of the electronic beam as a television monitor is scanned. The scanning rate for standard monitors is too fast for direct video output by low-cost computers, thus, a buffer is required. Motion control logic is one known type of buffer. For example, it is known to use separate motion counting or comparator circuits for each moving object to be displayed. With multiple objects, multiple counters or comparators are required which typically results in relatively complex and expensive circuitry.

As used herein, the term moving object refers to objects that are displayed on a video screen and movable on the screen in response to player-controlled input devices. Playfield objects, on the other hand, refer to display notations that are more or less stationary and are generated by a playfield generator as, for example, that described in U.S. Pat. No. 4,116,444, issued Sept. 26, 1978, in the names of Steven T. Mayer and Ronald E. Milner and assigned to the present assignee. Thus, for example, video game apparatus fashioned as a hockey game would generate such playfield objects as the goals, boundary lines and zone markers; the moving objects would represent the hockey players and puck.

U.S. Pat. No. 4,116,444 discloses the following method of generating a number of moving objects on a video display screen. Data specifying the locations at which moving objects are to be displayed on the screen is stored in a RAM. During a horizontal retrace interval, the stored data is scanned to determine any locations to be displayed for the upcoming horizontal display line to be actively scanned. Information is temporarily stored in locations in another random access memory (RAM) representing the next horizontal line in accordance with the stored location. An output display signal is delivered when the position of the beam, during active scan time, corresponds to the stored location. The RAM data is then used to activate a graphics generator-picture memory combination to generate the video data used to produce the video image on the display screen.

While the above known techniques are used quite satisfactorily in particular applications and under certain conditions, such techniques are not without certain disadvantages when sought to be used under conditions and requirements. For example, such techniques typically generate moving objects utilizing memory and logic circuits that are separate and apart from that used to generate playfield objects (e.g., those objects which are relatively stationary and usually non-responsive to player input). As a result, a large amount of duplication in both memory and logic circuitry is experienced, adding to the cost and complexity of the video amusement game apparatus. Moreover, several such techniques often require several levels of memory for moving symbol generation which, in turn, can place severe time limitations and timing constraints on system operation.

Further, when two or more of the moving objects are to overlap on the screen (e.g., during a "collision" between two vehicle objects), there is a tendency by certain of the above-described techniques to "mask" the video data, and therefore display of, one of the objects. More particularly, actual picture data in parallel form for a moving object is typically loaded into a converter (typically a parallel-to-serial shift register) which converts the data to video information. However, if the picture data for a first moving object is in the process of being converted when picture data for a second (overlapping) object is loaded into the converter, the remainder of the first object picture data is destroyed. Thus, a portion of the first movable object is "masked" by the second movable object.

SUMMARY OF THE INVENTION

The present invention, which is directed to generating both moving and playfield objects on a raster-type video display screen, provides a method and system for generating a number of movable objects on a video display screen which overcomes the above-mentioned disadvantages.

The method of the present invention includes the following steps: Data indicative of the locations at which the movable objects are to be displayed on the screen is stored in an object attribute memory. During each horizontal retrace interval, the moving object data is scanned to determine any objects to be displayed for the next active horizontal video line. For each movable object to be displayed, actual picture data corresponding to that object is transferred from a graphics memory and temporarily stored in a random access staging memory (RAM) for containing data representing the next horizontal line, at a location corresponding to the actual desired display position of the movable object on the video screen. During the following active display of the horizontal line, this staging RAM is accessed, providing serial motion object video picture data in synchronism with the position of the beam.

At the same time (i.e., during horizontal line display time), the object attribute memory is scanned to obtain playfield information used to obtain playfield picture data from the same graphics memory. The picture data is converted to video, summed with the moving object video and composite sync, and communicated to a video display unit via appropriate circuitry for driving the display.

Several advantages are obtained from the above-described invention. First, there are no separate moving and playfield object generation circuits; rather, substantial portions of the memory and symbol generation circuitry used by the method of the present invention are the same. Thereby, a savings in cost and circuit complexity is obtained. Further, motion object generation is effectively conducted during the horizontal blanking interval and stored until needed during active horizontal display time. Time constraints, and timing problems, are thus alleviated. In addition, the present invention requires less high speed memory than encountered in previous configurations. Accordingly, slower and less costly memory components can be utilized in the present invention.

As more fully described below, picture data is transferred from the graphics memory to the staging RAM by circuitry which ensures that information is not read into the staging RAM on top of previously stored (during the current horizontal blanking interval) picture data. If previously stored picture data is present, it is ORed with the incoming picture data and the result of this operation is stored. In this way, destruction of previously stored picture data is avoided and the "masking" problem referred to above is obviated.

For a fuller understanding of the nature of these and further advantages of the present invention, reference should be had to the ensuing detailed description taken in conjunction with the accompanying drawings.

BRIEF DESCRIPTION OF THE DRAWINGS

The FIGURE is a block diagram illustrating the present invention.

DETAILED DESCRIPTION OF THE INVENTION

The present invention is most advantageously practiced in the generation of both moving and playfield objects on a TV raster-type video display screen.

Referring now to the FIGURE, a microprocessor 10 is connected to a program memory 12 to provide for overall control of the various circuitry and game control of the present invention. The microprocessor 10 calculates the horizontal and vertical address of each moving object in response to information received on player input port 11. The vertical and horizontal position data for each moving object specifies the upper left-hand corner of the displayed moving object with the remainder of the object being generated by logic circuitry to be described herein. The horizontal and vertical position data for moving objects, together with a picture number (i.e., an identification of the object) for each moving object, is read out of the microprocessor on its data bus 14, communicated to object attribute random access memory (RAM) 16, and stored. Playfield information is communicated to and stored in the object attribute RAM 16 in the same manner.

Object attribute RAM 16 contains 256 memory locations, each memory location being a digital word that is four bytes or 32 bits in length. Sixteen of the digital words are dedicated to storing moving object attribute information, each word corresponding to one moving object. The remaining storage locations of object attribute RAM 16 are used to store playfield object information in much the same manner as described in above-noted U.S. Pat. No. 4,116,444, the disclosure of which is hereby incorporated by reference.

The horizontal and vertical positions of each moving object are each represented by eight bits of data. Moreover, a picture number, indicative of the type of object to be displayed, is also represented by eight bits. Thus, 24 of the 32 available bits of each data word allocated to each moving object are used, leaving eight spare bits. It can be seen, therefore, that position information can easily be expanded for higher resolution, if desired.

Overall timing and control for the circuitry of the FIGURE is provided by the sync generator 20, which includes conventional internal and horizontal and vertical sync counters driven by a 6 MHz clock (CLK) signal and used to generate various addressing, enabling and timing signals. These signals are generally designated as H count, V count, H blank and V blank and, for the purposes of the following description, are collectively referred to as SG timing signals. The SG timing signals are distributed to the various parts of the circuitry illustrated in FIG. 1 via SG timing line 22. In addition, the sync generator 20 generates a composite sync signal for use in driving the video display unit 24.

The sync generator 20 also provides a CLK/8 signal—a clock that is the CLK signal divided by eight. The CLK/8 signal is a symmetrical square wave; that is, CLK/8 signal is in one logic state for approximately one-half of a cycle and in a second logic state for the remainder of the cycle. This symmetrical attribute of the CLK/8 signal is used to interleave access to the RAM 16 between the microprocessor 10 and addresses generated by SG signals (designated as H count and V count) provided by the sync generator 20 (typically referred to as simultaneous direct memory access or DMA). Thus, the CLK/8 signal is applied to the RAM address logic 17 and used, via conventional gating logic (not shown) in the RAM address logic 17, to communicate the address supplied by the microprocessor 10 to the RAM during one state of the CLK/8 signal. During the other state of the CLK/8 signal, the address formed by H count and V count—a part of the SG timing—is communicated to the RAM 16.

When the object attribute RAM 16 is accessed by the address formed from the SG timing signal, only a read operation is performed. The ability to write data to the object attribute RAM 16 is given to the microprocessor alone. Thus, when a write operation is performed, the read/write line (R/W) between the microprocessor 10 and the read/write control 18 is activated, causing the object attribute RAM 16 to accept and store the data presented to data bus 14. When the R/W line is deactivated, the object attribute RAM 16 is in a read state only and data can only be accessed therefrom.

This interleaving allows the display circuitry to fetch object information from predetermined memory address locations on alternate cycles of the CLK/8 signal, sharing access to the object attribute RAM 16 with the microprocessor 10. As noted, the memory address locations are specified by appropriate signals from the horizontal and vertical counters contained in the sync generator—represented in the FIGURE as H and V count. Thus, the actual access of data from the object attribute RAM 16 to the display circuitry is independent from and invisible to the microprocessor 10. Consequently, the microprocessor 10 can update playfield or motion object information at any time by communicating an address to RAM address logic 17, activating the R/W line to the read/write control logic 18 and writing into the location selected during the microprocessor portion of each CLK/8 cycle.

During the horizontal blanking interval of each active display line of the video display 24, the object attribute RAM 16 is addressed in a scanning fashion by the timing signals provided by sync generator 20, which are applied to RAM address logic 17 via SG timing line 22. Each of the 16 moving object data words is read out of object attribute RAM 16 during each horizontal blanking time. The 8-bit portion of each word specifying the vertical position for each moving object is applied to subtractor and compare circuit 26 where it is compared to the vertical count of the sync generator 20. Subtractor circuit 26 compares these two quantities and, if the difference is within a predetermined line range, indicating that a moving object is to be displayed during the upcoming line, a "match" signal is generated. At the same time, an "n"-bit line number, (where $2^n$ is the vertical size of the moving object) indicative of the vertical line segment of the moving object to be generated, is provided by subtractor circuit 26. In the preferred embodiment, n=3 and, therefore, three bits are supplied by subtractor circuit 26. (These three bits decode to eight lines of object height).

At the same time, the 8-bit portion of the moving object data word describing the horizontal position is applied to a buffer storage latch 28 where it is temporarily stored. Storage latch 28 holds these eight bits of data for an appropriate delay time until the horizontal position data is transferred from latch 28 to horizontal position counter 30. The eight bit picture number is transferred through multiplexer 32, under selection control of multiplex control logic 33 (in response to SG timing signals supplied via SG timing line 22) to picture latch 34 where the picture number is temporarily stored.

If any of the sixteen moving objects represented by the 32-bit word read-outs of the object attribute RAM 16 during horizontal blanking has a vertical position that is within the predetermined range referred to above, the "n"-bit difference between the vertical position data and the line count produced by signal generator 20 becomes, in conjunction with the 8-bit picture number stored in picture latch 34, the address used to address graphics ROM 40 via ROM address logic 42.

Graphics ROM 40 contains the actual picture data (defining, for example, the pictorial configuration of the moving object) which is ultimately converted to video data. In addition, the graphics ROM also contains the graphics elements used to construct the playfield video, which will be described more fully below. For the present, the match signal generated by subtractor circuit 26 is applied to graphics ROM 40 to cause eight bits of video data corresponding to the object, to be transferred in parallel from ROM 40 to parallel-to-serial converter 46. If, on the other hand, ROM 40 is not enabled, converter 46 receives eight bits of null information (e.g., 8 logic "0"s). Typically, converter 46 is an 8-bit parallel-in, serial-out shift register controlled by the SG timing signals produced by sync generator 20, communicated to the converter 46 via SG timing line 22.

Under the control of the SG timing signals, the contents (either graphics or null information) of converter 46 are shifted serially therefrom, forming video data on line 48. This serial video is applied via gating logic 52, which is enabled throughout the horizontal blanking interval, to a staging random access memory (RAM) 50 which in the preferred embodiment comprises a 256 by one-bit memory. At the same time and synchronous therewith, the horizontal position counter, containing eight bits of horizontal position information, receives a series of count pulses from counter control logic 31. In response, counter 30 addresses eight successive one-bit storage locations of staging RAM 50. As each one-bit storage location is addressed, the data located at that position of RAM 50 is first read out and communicated to gating logic 52 where it is ORed with the serial video data from converter 46. The result is stored at the location of staging RAM 50 specified by the address supplied by horizontal position counter 30. Since the 8-bits of video data are stored at any location of the staging RAM 50, as determined by the horizontal position data of the motion object, portions of the video data of one motion object can overlap that of another—representing a collision between the two, for example. However, the process of ORing incoming video data with data stored at the addressed location obviates any "masking" effect caused by the incoming video blotting out previously loaded video information of motion objects.

To summarize, during horizontal blanking, each 32-bit data word corresponding to each moving object is sequentially read out of object attribute RAM 16 under control of the SG timing signals provided by sync generator 20. The eight bits of vertical position information are used to determine if the moving object symbol is within display range of the present vertical line number. The horizontal position data is transferred to horizontal position counter 30. If the vertical position of the moving object is within range, the difference between the moving object vertical position and the vertical line number is combined with the picture number. This combination is used to address graphics ROM 40 and causes eight bits of video data to be transferred to converter 46. If the vertical position of the moving object is not within range, the converter receives eight logic "0"s. Serial video is then communicated from converter 46 to RAM 50 via gating logic 52.

At the commencement of video scan time (e.g., display of the horizontal line) the horizontal position counter 30 is preset to zero by SG timing via counter control logic 31. Control logic 31 then supplies counter 30 with 256 count pulses, causing the counter to sequentially address each of the 256 one-bit locations of staging RAM 50. Thereby, video data sequentially appears on line 54 and is transferred through summer 56 to video display 24. Of course, operation of counter 30 is synchronous with the beam position of display 24. As each bit in the staging RAM 50 is displayed, the control logic 31 and the gating logic 52 cause that bit position of RAM 50 to be cleared to logic "0," ready for the next horizontal line. Summing junction 56 also receives composite sync and, as will be more fully explained below, the video playfield data on line 58 from converter 46.

Before proceeding further with a discussion of the operational aspects of the present invention, insofar as playfield symbol generation is concerned, it is advantageous at this point to consider certain underlying concepts of playfield generation. Briefly, as has been pointed out to some extent in U.S. Pat. No. 4,116,444, the video display 24 is conceptually divided into a matrix for the purpose of displaying various playfield building blocks. The building blocks are listed and have their actual video display characteristic or shape stored in graphics ROM 40 in a building block format. More particularly, a given playfield object or element may be composed of several segments and, depending upon the configuration of the object, these various segments are arranged in proper format by the object attribute RAM 16.

The object attribute RAM 16, during video scan time, controls graphics ROM 40 by supplying eight bits of information via multiplexer 32 and picture latch 34, in conjunction with information supplied by the SG timing signals, to address graphics ROM 40. ROM 40 responds by providing a proper building block.

Thus, during video scan time of a line, the SG timing signals on line 22 are used to address object storage RAM 16 via RAM address logic 17. A 32-bit word is caused to be read out of the RAM and applied to multiplexer 32. Eight-bit portions of the playfield word are sequentially selected by multiplexer 32 and applied to picture latch 36, where they are temporarily stored. Each 8-bit portion is then applied to address logic 42 and, in conjunction with SG timing signals, used to address graphics ROM 40, containing actual playfield picture data, as described above. Eight bits of playfield picture data are provided by ROM 40 and applied to converter 46. As described above with reference to moving object signal generation, converter 46 provides video data on line 48 which is now communicated to summer 56 by line 58.

As will now be apparent, the invention permits the sharing of memory and symbol generation circuitry by both moving and playfield objects, thereby eliminating the heretofore utilized separate and independent moving object and playfield object generation circuitry. As a result, symbol generation for display in video amusement games can be accomplished at less cost and less circuit complexity. In particular, the provision of memory sharing capability, thereby eliminating additional memory elements, significantly reduces cost in light of the present expense of bipolar random access memory.

Moreover, the present invention avoids the possible destruction of picture data previously stored during the same horizontal blanking interval by ORing the contents of the storage location of staging RAM 50 with the picture data being read into the location. Thus, a first moving object is not "masked" by a second, overlapping moving object.

While the above provides a full and complete disclosure of the preferred embodiment of the present invention, various modifications, alternate constructions and equivalents may be employed without departing from the true spirit and scope of the invention. For example, motion objects can be made wider by concatenating two or more motion objects or by employing multiple staging RAMs. Similarly, color or multiple gray level graphics or higher resolution graphics may be created by employing multiple staging RAMs in various configurations with a more complex video mixing circuit. Also, it is clear that graphics memory 40 could be designed as a modifiable RAM rather than a ROM, so that graphics could be changed under control of microprocessor 10. Therefore, the above description and illustrations should not be construed as limiting the scope of the invention, which is defined by the appended claims.

What is claimed is:

1. Apparatus for controlling the display of different objects on a raster scan video display screen of the type having image-forming means including a controllable electron beam forming a plurality of horizontal lines in response to horizontal and vertical timing signals, including horizontal retrace intervals, the apparatus comprising:
    first memory means for storing data indicative of the desired position of first ones of said objects on the display screen;
    means for scanning the first memory means during each horizontal retrace interval and for determining the objects to be displayed for the next horizontal line;
    second memory means for containing video data for the objects to be displayed, the second memory means being responsive to the scanning means and the object position data obtained from the first memory means to provide said video data for the objects to be displayed for the next horizontal line;
    third memory means for temporarily storing said video data at locations corresponding to the horizontal position of the video data within the next horizontal line; and
    means for sequentially accessing the temporarily stored video data from said third memory means synchronously with the electron beam scan during each horizontal line and for communicating the accessed data to the video display screen.

2. The apparatus of claim 1, wherein a predetermined number of said objects to be displayed are movable about the display screen, the apparatus further including:
    input means adapted to receive movable object position signals from at least one of a plurality of player input controls; and
    processor means responsive to the receipt of said movable object position signals for generating the position data of the movable objects and for storing said position data in said first memory means.

3. The apparatus of claim 1, wherein the first memory means includes means for storing data indicative of second ones of said objects, and the scanning means includes means for accessing video data from said second memory means for the second ones of said objects during each horizontal line synchronously with the electron beam scan.

4. The apparatus of claim 1, wherein the first memory means includes means for storing data indicative of second ones of said objects, and the scanning means includes means for accessing the first memory means synchronously with the electron beam and during each horizontal line scan to obtain and communicate the data indicative of second ones of said objects to said second memory means, said second memory means being responsive to the second object data to provide video data corresponding to said second ones of said objects.

5. The apparatus of claim 4, wherein said first ones of said objects to be displayed are movable about the display screen, the apparatus further including:
    input means adapted to receive movable object position signals from at least one of a plurality of player input controls; and
    processor means responsive to the player input controls for generating the position data of the movable objects.

6. The apparatus of claim 5, wherein said second ones of said objects to be displayed are relatively stationary on the display screen.

7. A method of controlling the display of different objects on a video display screen of the type having image-forming means including a controllable electron beam for scanning said video display screen to form a plurality of horizontal line scans in response to horizontal and vertical timing signals, including horizontal retrace intervals, said method comprising the steps of:
    storing data indicative of the desired position of first ones of said objects on the display screen in a first memory;
    during each horizontal retrace interval preceding each active horizontal line:
    a. scanning the object position data in said first memory and determining the objects to be displayed for the next horizontal line scan;

b. accessing video data for the objects to be displayed in the upcoming horizontal line scan from a second memory;

c. temporarily storing said video data in a third memory at locations corresponding to the horizontal position of the video data within the upcoming horizontal line scan; and during each horizontal line scan, sequentially accessing said video data from said third memory synchronously with the electron beam and communicating said accessed video data to said video display screen for display.

8. A method as in claim 7, wherein said object position data storing step includes the step of storing data representative of second ones of said objects, and, during each horizontal line scan, further including the steps of:

scanning the data in said first memory representative of the second ones of said objects in synchronism with the electron beam;

accessing video data for the second ones of said objects from the second memory; and combining the second object video data with the first object video data.

9. A method as in claim 7, wherein the first ones of said objects to be displayed are movable about the screen in response to player input controls.

10. A method as in claim 7, including the steps of:

providing a periodic clock signal to the first memory, the clock signal having at least a first and a second logic state; and selectively updating the object position data in said first memory during the first logic state of the clock signal.

11. The method of claim 7, wherein said step of temporarily storing said video data includes the steps of:

accessing stored data from the location of the third memory at which said video data is to be temporarily stored;

combining said stored data with said video data; and temporarily storing said combined data in the third memory at locations indicative of the position of the video data.

12. A motion object circuit for a raster scan display system for providing a video display signal representative of motion objects, the circuit comprising:

an object memory for storing data corresponding to a plurality of motion objects having an address input and a data output for providing a vertical location signal, a horizontal location signal and an object designator signal on the data output representative of the display location and type of designated objects in response to an address signal on the address input;

timing circuitry for providing a vertical count signal representative of the vertical position of the current raster scan line;

a comparator circuit coupled to the object memory and to the timing circuitry to receive the vertical count signal and the vertical location signal for enabling designated objects of be displayed on the current raster scan line and for providing a line number signal corresponding to a horizontal scan of enabled designated objects;

a graphics memory coupled to the object memory and to the comparator circuit for providing video data corresponding to a bit-for-bit representation of a single horizontal scan of a designated object, the scan selected in response to the line number signal and the object designator signal; and a staging memory having data locations corresponding to a single raster scan line coupled to the object memory and to the graphics memory for storing video data corresponding to a plurality of designated objects prior to the display of the corresponding raster scan line, the video being stored at locations in the staging memory in response to the horizontal location signals associated with each designated object, the staging memory including means for providing a video display signal corresponding to a combined display of the plurality of designated objects on the current raster scan line.

13. A motion object circuit as in claim 12 for a raster scan display system for providing a combined video display signal representative of motion and playfield objects, the circuit further comprising:

display summing circuitry coupled to the graphics memory and to the staging memory for combining the video data and the video display signals to provide the combined video display signal representative of motion and playfield objects.

14. A motion object circuit for a video game as in claim 13 wherein the designated objects selectively stored in the staging memory correspond to motion objects which have display locations in the object memory responsive to manually generated player input signals and the video data combined with the display signals in the display summing circuitry correspond to playfield objects.

15. A motion object circuit for a video game as in claim 13 further comprising gating means coupled between the graphics memory and the staging memory to receive the video display signal from the staging memory and the video data from the graphics memory for providing a signal responsive to the video display signal representing previously stored video data, and the video data from the graphics memory to the staging memory for storing in the staging memory.

* * * * *